(12) United States Patent
Weng

(10) Patent No.: US 10,268,852 B2
(45) Date of Patent: Apr. 23, 2019

(54) ELECTRONIC DEVICE AND READING METHOD

(71) Applicants:LITE-ON ELECTRONICS (GUANGZHOU) LIMITED, Guangzhou (CN); LITE-ON TECHNOLOGY CORPORATION, Taipei (TW)

(72) Inventor: Chih-Chung Weng, New Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 0 days.

(21) Appl. No.: 15/818,705

(22) Filed: Nov. 20, 2017

(65) Prior Publication Data

US 2018/0204033 A1    Jul. 19, 2018

(30) Foreign Application Priority Data

Jan. 13, 2017    (CN) .......................... 2017 1 0025874

(51) Int. Cl.
| | | |
|---|---|---|
| *G06K 15/12* | (2006.01) |
| *G06K 7/10* | (2006.01) |
| *G06F 3/042* | (2006.01) |
| *G06F 3/16* | (2006.01) |
| *G06K 7/14* | (2006.01) |
| *G06F 3/041* | (2006.01) |

(52) U.S. Cl.
CPC ....... *G06K 7/10722* (2013.01); *G06F 3/0416* (2013.01); *G06F 3/0421* (2013.01); *G06F 3/165* (2013.01); *G06F 3/167* (2013.01); *G06K 7/10821* (2013.01); *G06K 7/10891* (2013.01); *G06K 7/1413* (2013.01)

(58) Field of Classification Search
CPC . G06K 7/10722; G06K 7/1404; G06K 7/1447
USPC .......................... 235/462.41, 462.45, 462.49
See application file for complete search history.

(56) References Cited

U.S. PATENT DOCUMENTS 9,613,448 B1 *    4/2017    Margolin ................ G06T 11/60
9,811,728 B2 *   11/2017    King .................. G06K 9/00483

FOREIGN PATENT DOCUMENTS

| CN | 104102412 A | 10/2014 |
| TW | 200929000 | 7/2009 |

* cited by examiner

*Primary Examiner* — Daniel St Cyr
(74) *Attorney, Agent, or Firm* — Li & Cai Intellectual Property (USA) Office

(57) ABSTRACT

An electronic device comprises a processing unit, and an infrared touch display panel, an image capturing unit and a speaker electrically connected to the processing unit. The infrared touch display panel has a plurality of infrared transmitters and a plurality of infrared receivers. The image capturing unit captures a barcode pattern and generates a barcode image. The processing unit drives the image capturing unit and at least part of the infrared transmitters, and turns off the infrared receivers according to a scanning instruction. The processing unit generates an output signal according to the barcode image. The infrared touch display panel displays a visual information according to the output signal. The speaker generates an audio signal according to the output signal.

9 Claims, 3 Drawing Sheets

ELECTRONIC DEVICE AND READING METHOD

FIELD OF THE INVENTION

The present disclosure relates to an electronic device and reading method, in particular to an electronic device and a reading method having audio and visual effect.

BACKGROUND OF THE INVENTION

Current reading products on the market use optical identification technology to read digital information hidden in print, and generate a corresponding sound or music, so as to achieve the purpose of learning or entertainment. However, conventional reading products are only able to emit sound effects, and are not able to generate dynamic visual effects. Thus, usage of these conventional reading products can be a monotonous experience, and the applicability thereof is also limited. It is therefore an important issue in the art to provide an electronic device with both audio and visual effects, so as to better appeal to users and to provide more interesting content to improve learning effectiveness.

SUMMARY OF THE INVENTION

The present disclosure provides an electronic device that is different from relevant prior art, and that is able to emit both images and sounds, thus improving learning effectiveness and generating vivid and entertaining learning content to be read.

The present disclosure provides a reading method used for an electronic device comprising: a processing unit, an infrared touch display panel, an image capturing unit and a speaker, wherein the infrared touch display panel has a plurality of infrared transmitters and a plurality of infrared receivers, and the reading method includes: driving the image capturing unit and at least part of the infrared transmitters, and turning off the infrared receivers by the processing unit according to a scanning instruction; capturing a barcode pattern and generating a barcode image by the image capturing unit; generating an output signal by the processing unit according to the barcode image; displaying a visual information by the infrared touch display panel according to the output signal; and generating an audio signal by the speaker according to the output signal.

The present disclosure embodiment an electronic device including: a processing unit; an infrared touch display panel electrically connected to the processing unit, and the infrared touch display panel having a plurality of infrared transmitters and a plurality of infrared receivers; an image capturing unit electrically connected to the processing unit, and the image capturing unit capturing a barcode pattern and generating a barcode image; and a speaker electrically connected to the processing unit. The processing unit according to a scanning instruction drives the image capturing unit and at least part of the infrared transmitters, and turns off the infrared receivers, the processing unit generates an output signal according to the barcode image, the infrared touch display panel according to the output signal displays a visual information, and the speaker according to the output signal generates an audio signal.

The electronic device and the reading method of the present disclosure uses an infrared touch display panel to achieve the effect of the conventional reading pen, and displays sounds and images to users to improve learning effectiveness by using the infrared touch display panel to emit the infrared, and using the image capturing unit to read the barcode pattern and generate the barcode image.

To further understand the techniques, means and effects of the present disclosure, the following detailed descriptions and appended drawings are hereby referred to, such that, and through which, the purposes, features and aspects of the present disclosure can be thoroughly and concretely appreciated. However, the appended drawings are provided solely for reference and illustration, without any intention to limit the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION OF THE PREFERRED EMBODIMENTS

Embodiments of an electronic device and a reading method according to the present disclosure are described herein. Other advantages and objectives of the present disclosure can be easily understood by one skilled in the art from the disclosure. The present disclosure can be applied in different embodiments. Various modifications and variations can be made to various details in the description for different applications without departing from the scope of the present disclosure. The drawings of the present disclosure are provided only for simple illustrations, but are not drawn to scale and do not reflect the actual relative dimensions. The following embodiments are provided to describe in detail the concept of the present disclosure, and are not intended to limit the scope thereof in any way.

Figure 1:
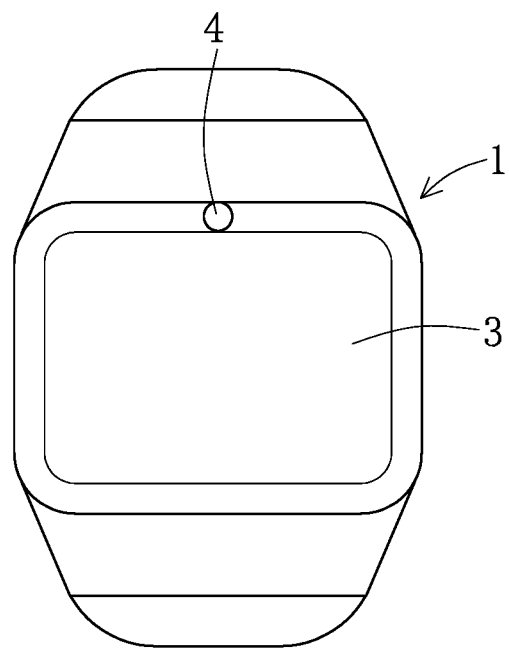
FIG. 1 is a schematic view of an electronic device according to an embodiment of the present disclosure.
Figure 2:
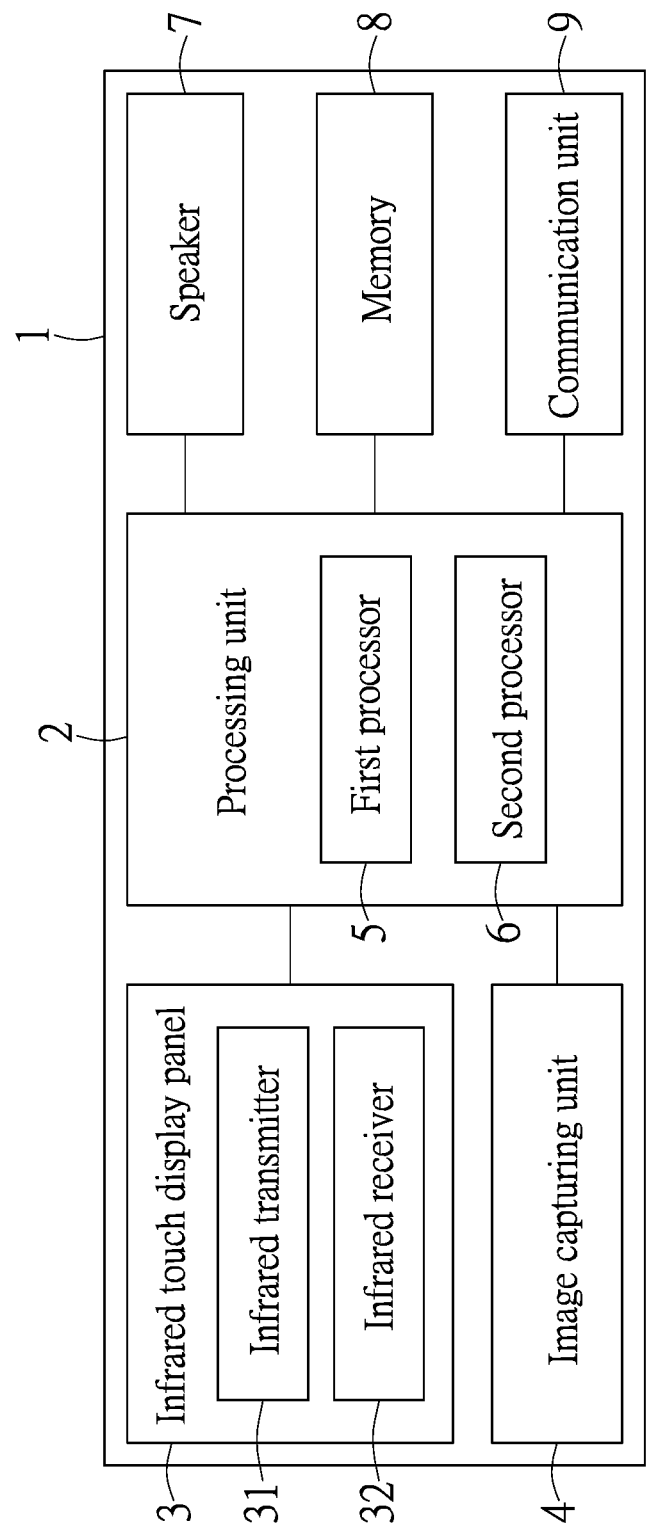
FIG. 2 shows a systematic block diagram of an electronic device according to an embodiment of the present disclosure.

Reference is made to FIG. 1 and FIG. 2, the present disclosure embodiment provides an electronic device 1 including a processing unit 2, an infrared touch display panel 3, an image capturing unit 4, a speaker 7, a memory 8, and a communication unit 9. The processing unit 2 includes a first processor 5 and a second processor 6, the infrared touch display panel 3 is electrically connected to the processing unit 2, the image capturing unit 4 is electrically connected to the processing unit 2, the speaker 7 is electrically connected to the processing unit 2, the memory 8 is electrically connected to the processing unit 2, and the communication unit 9 is electrically connected to the processing unit 2.

In the embodiment, the infrared touch display panel 3 has a plurality of infrared transmitters 31 and a plurality of infrared receivers 32. The infrared transmitters 31 are located on two adjacent sides of the infrared touch display panel 3, and the infrared receivers 32 are located opposite to the infrared transmitters 31. In addition, the first processor 5 may be an image signal processor, and the second processor 6 may be a central processor or a microcontroller.

The electronic device 1 of the embodiment of the present disclosure may be a portable electronic device, such as a mobile phone, a personal digital assistant (i.e., a PDA), a tablet, or a wearable electronic device, such as a watch, a bracelet, a necklace or jewelry. In the embodiment, the electronic device 1 is exemplified as a watch, but should not be taken as limiting the present disclosure.

In addition, it should be noted that, as shown in FIG. 1, the shape of the electronic device 1, the disposition of the image capturing unit 4, and the pattern displayed by the infrared touch display panel 3 are all examples for description, and can all be adjusted based on practical requirements.

In the present disclosure embodiment, when the electronic device 1 performs the reading method, the user may click or touch a pattern displayed by the infrared touch display panel 3 to make the electronic device 1 execute an application to generate a scanning instruction and thus enable a reading mode. Alternatively, in another embodiment of the present disclosure, the electronic device 1 further includes a button. When the user pushes the button, the reading mode is enabled by the generated scanning instruction. Alternatively, in yet another embodiment of the present disclosure, the electronic device 1 further includes a microphone connected to the processing unit 2. The microphone receives a speech command of the user to generate the scanning instruction making the electronic device 1 enable the reading mode. Alternatively, the electronic device 1 of the embodiment of the present invention further includes a sensing device connected to the processing unit 2, generating the scanning instruction and enabling the reading mode by triggering with a sensing signal. The sensing device is, for example, a nearby communication device or a radio frequency identification device. It should be noted that, a skilled person in this field may appreciate the method for triggering the reading mode of the electronic device 1, which may use either voice, touch, and/or sensing, etc.; thus, the present disclosure is not limited in this aspect.

Figure 3:
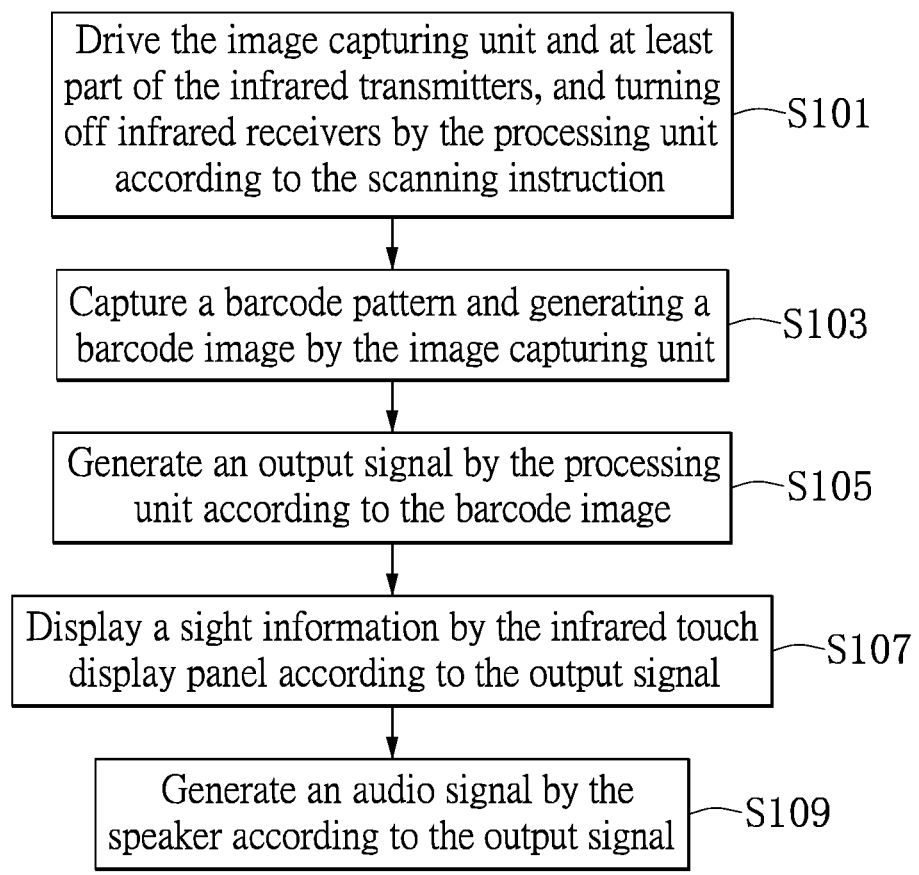
FIG. 3 shows a flowchart of a reading method according to an embodiment of the present disclosure.

Reference is made to FIG. 3, the reading method performed by the electronic device of the embodiment of the present disclosure may be applied to the aforementioned electronic device 1. The reading method includes the steps of: step S101: driving the image capturing unit 4 and at least part of the infrared transmitters, and turning off infrared receivers by the processing unit 2 according to the scanning instruction; step S103: capturing a barcode pattern and generating a barcode image by the image capturing unit 4; step S105: generating an output signal by the processing unit 2 according to the barcode image; step S107: displaying a visual information by the infrared touch display panel 3 according to the output signal; step S109: generating an audio signal by the speaker 7 according to the output signal.

In the embodiment, when the user clicks or touches the pattern displayed by the infrared touch display panel 3, the electronic device 1 will execute a corresponding application and generate the scanning instruction S1, and the processing unit 2 drives the image capturing unit 4 and at least part of the infrared transmitters 31 according to the scanning instruction S1 to make the infrared transmitter 31 emit infrared. At this moment, the processing unit 2 turns off all of the infrared receivers 32.

After the reading mode is enabled, the user points the image capturing unit 4 of the electronic device 1 toward an object to be read to make at least part of the infrared transmitters 31 of the infrared touch display panel 3 emit infrared onto a read pattern of the object, and to make the image capturing unit 4 capture the barcode pattern and generate the barcode image. The barcode pattern may be an optical identification code or a rapid response matrix code.

Next, the first processor 5 of the processing unit 2 identifies the barcode image and generates a decoding information, the second processor 6 then generates an output signal according to the decoding information. In the embodiment, the second processor 6 reads the output signal from the memory 8 according to the decoding information, and the output signal corresponds to the decoding information, the first processor 6 may then divide the output signal into a visual information and an audio signal, and transmit the visual information to the infrared touch display panel 3 and the audio signal to the speaker 7, to make the infrared touch display panel 3 display the visual information, and the speaker 7 display the audio signal. For example, when the decoding information represents a children's story, the infrared touch display panel 3 will display an image or a text corresponding to the children's story, and the speaker 7 will synchronously display a speech content corresponding to the image or the text.

When the infrared transmitter 31 emits infrared onto the read pattern, the second processor 6, according to a distance between the image capturing unit 4 and the barcode pattern, adjusts an emitting number of the infrared transmitters 31 or an emitting power of the infrared transmitters 31. For example, if the distance is longer, the emitting number of the infrared transmitters 31 would be greater, or the emitting power of the infrared transmitter 31 would be increased, to ensure that the barcode image is identified correctly. Furthermore, power consumption may be reduced by appropriately adjusting the emitting number or the emitting power of the infrared transmitters 31, or turning off all of the infrared receivers 32.

It should be noted that, when the decoding information represents an error information, the speaker 7 outputs an audio alert message or the infrared touch display panel 3 displays a visual alert message to alert the user to re-scan or to show the user that the barcode image does not have the corresponding audio or video content.

In an embodiment, when the second processor 6 of the electronic device 1 according to the decoding information finds the output signal from the memory 8, and the output signal corresponds to the decoding information, the second processor 6 emits an alert audio by the speaker 7 to inform the user that the output signal corresponding to the decoding information is found, and/or the second processor 6 transmits a video to the infrared touch display panel 3 to make the infrared touch display panel 3 display an alert video, such as that with a flashing screen.

In an embodiment of the present disclosure, the electronic device 1 may further include a communication unit 9 connected to the second processor 6 for connecting a database through network to download the output signal corresponding to the decoding information when the second processor 6 cannot find the output signal from the memory 8 according to the decoding result. Alternatively, when the second processor 6 finds the output signal corresponding to the decoding information from the memory 8 according to the decoding result, the second processor 6 can transmit a visual information and an audio signal of the output signal to other mobile devices or electronic devices by connecting to mobile or electronic devices such as personal computers, tablets, smartphones, etc. with the communication unit 9 for emission.

In summary, the present disclosure provides an electronic device and reading method that is not only capable of emitting sounds as with the conventional reading pen, but further capable of displaying images and reducing power consumption.

The aforementioned descriptions merely represent the preferred embodiments of the present disclosure, without any intention to limit the scope of the present disclosure which is fully described only within the following claims. Various equivalent changes, alterations or modifications based on the claims of the present disclosure are all, consequently, viewed as being embraced by the scope of the present disclosure.

What is claimed is:

1. A reading method used for an electronic device including a processing unit, an infrared touch display panel, an image capturing unit and a speaker, wherein the infrared touch display panel has a plurality of infrared transmitters and a plurality of infrared receivers, the reading method comprising:
driving the image capturing unit and at least part of the infrared transmitters, and turning off the infrared receivers by the processing unit according to a scanning instruction;
capturing a barcode pattern and generating a barcode image by the image capturing unit;
generating an output signal by the processing unit according to the barcode image;
displaying a piece of visual information by the infrared touch display panel according to the output signal; and
generating an audio signal by the speaker according to the output signal;
wherein the processing unit includes a first processor and a second processor, the first processor identifies the barcode image and generates a piece of decoding information, and the second processor generates the output signal according to the decoding information.

2. The reading method of claim 1, wherein the scanning instruction is generated by one of executing an application of the electronic device, pushing a button of the electronic device, a speech command received by the electronic device, and a sensing signal received by the electronic device.

3. The reading method of claim 1, wherein when the decoding information represents a piece of error information, the speaker outputs an audio alert message or the infrared touch display panel displays a visual alert message.

4. The reading method of claim 1, wherein the second processor reads the output signal from a memory of the electronic device according to the decoding information, or the processor downloads the output signal from a remote database by a communication unit of the electronic device according to the decoding information.

5. The reading method of claim 4, wherein the processing unit adjusts an emitting number of the infrared transmitters or an emitting power of the infrared transmitters according to a distance between the image capturing unit and the barcode pattern.

6. An electronic device comprising:
a processing unit;
an infrared touch display panel electrically connected to the processing unit, and the infrared touch display panel having a plurality of infrared transmitters and a plurality of infrared receivers;
an image capturing unit electrically connected to the processing unit, the image capturing unit capturing a barcode pattern and generating a barcode image; and
a speaker electrically connected to the processing unit;
wherein the processing unit according to a scanning instruction drives the image capturing unit and at least part of the infrared transmitters, and turns off the infrared receivers, the processing unit generates an output signal according to the barcode image, the infrared touch display panel according to the output signal displays a piece of visual information, and the speaker according to the output signal generates an audio signal;
wherein the processing unit includes a first processor and a second processor, the first processor identifies the barcode image and generates a piece of decoding information, and the second processor generates the output signal according to the decoding information.

7. The electronic device of claim 6, wherein when the decoding information represents a piece of error information, the speaker outputs an audio alert message or the infrared touch display panel displays a visual alert message.

8. The electronic device of claim 6 further comprising:
a memory electrically connected to the processing unit; and
a communication unit electrically connected to the processing unit;
wherein the processor from the memory reads the output signal according to the decoding information, or the processor downloads the output signal from a remote database by the communication unit according to the decoding information.

9. The electronic device of claim 6, wherein the processing unit, according to a distance between the image capturing unit and the barcode pattern, adjusts an emitting number of the infrared transmitter or an emitting power of the infrared transmitters.

* * * * *